J. HARRIS.
GAS REGULATOR.
APPLICATION FILED APR. 5, 1917.
1,283,508.
Patented Nov. 5, 1918.
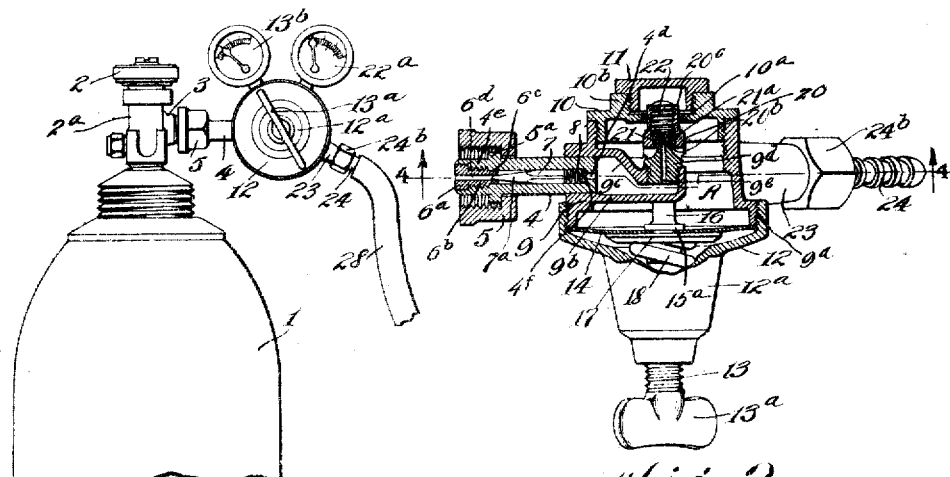
Fig. 1. Fig. 2.
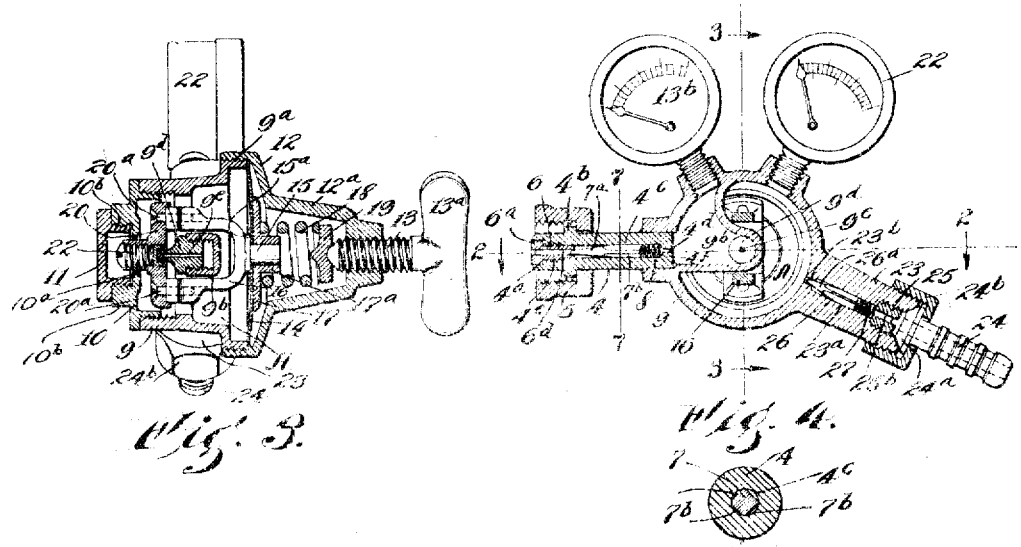
Fig. 3. Fig. 4.
Fig. 7.
Fig. 5. Fig. 6.
Inventor,
John Harris,
By his Attorneys.

UNITED STATES PATENT OFFICE.

JOHN HARRIS, OF LAKEWOOD, OHIO, ASSIGNOR, BY DIRECT AND MESNE ASSIGNMENTS, TO THE HARRIS CALORIFIC COMPANY, OF CLEVELAND, OHIO, A CORPORATION OF OHIO.

GAS-REGULATOR.

1,283,508.

Specification of Letters Patent.     Patented Nov. 5, 1918.

Application filed April 5, 1917. Serial No. 159,894.

*To all whom it may concern:*

Be it known that I, JOHN HARRIS, a citizen of the United States, residing at Lakewood, in the county of Cuyahoga and State of Ohio, have invented a certain new and useful Improvement in Gas-Regulators, of which the following is a full, clear, and exact description, reference being had to the accompanying drawings.

This invention relates to a regulator for gases and more particularly to a regulator of the type employed in connection with the oxygen and combustible gases used with the cutting and welding torches. One of the objects of my invention is to provide a regulator which may be conveniently adjusted for any desired working pressure at the delivery side thereof and which when so adjusted will automatically maintain such working pressure. Another object of the invention is to provide a regulator wherein the diaphragm as well as the gage or gages connected therewith will be protected from rupture through sudden inflow of gas under high pressure thereinto. Another object of the invention is to provide a regulator with means whereby gas under higher pressure from another source (as from an oxygen tank or a combustible fluid tank) will be prevented from entering the tank with which the regulator may be connected, as well as normally preventing the entry of such gas or gases into the regulator itself; also to prevent the transmission of pressure (due to a backfire) into the regulator chamber and into the connections leading therefrom to the gages and to the supply tank. A further object of the invention is to provide a regulator wherein an efficient pressure regulation may be accomplished without danger of freezing due to excessive expansion of the inflowing gas. Further and more generally stated, my invention may be defined as consisting of the combinations of elements illustrated in the drawings forming part hereof and set forth in the claims appended hereto. In the drawings, there is illustrated one embodiment of my invention, Figure 1 showing in elevation a portion of the supply tank and my regulator applied thereto; Fig. 2 a horizontal sectional view through the regulator, certain parts being shown in elevation, the view corresponding substantially to the line 2—2 of Fig. 4; Fig. 3 a sectional view taken at substantially right angles to Fig. 1; Fig. 4 a sectional view corresponding to the line 4—4 of Fig. 2 looking in the direction of the arrows; Figs. 5 and 6 are details in perspective of the check valve in the inlet and outlet connections of the regulator; and Fig. 7 a sectional detail of said valve corresponding to the line 7—7 of Fig. 4.

Describing by reference characters the various parts illustrated herein, 1 denotes a supply tank which may contain any gas the pressure whereof is to be regulated, as oxygen or combustible gases. This tank is provided at its upper end with the usual valve 2 and casing $2^a$ whereby the flow of gas from the tank to the outlet connection 3 through the casing $2^a$ may be controlled or cut off, as desired. It will be observed that the connection 3 is threaded at its outer end and is preferably cupped (not shown) for the reception of the adjacent end $4^a$ of the regulator connection 4. It will be understood that the cupped end of the connection 3, as is usual, is so shaped as to form a tight joint with the end $4^a$ of the connection 4. The bore 4 is enlarged at the receiving end thereof and provided in such enlarged part with a thread, as indicated at $4^e$, while the outer end is provided with a cylindrical recess for the reception of the head $6^a$ of a nipple 6, said nipple being provided with an externally threaded portion $6^b$ adapted to be threaded into the threaded portion $4^e$ of the bore and with a reduced cylindrical extension $6^c$ which is adapted to fit within the bore 4. The nipple 6 is provided with a central bore $6^d$ and is adapted to receive therewithin and form a valve-seat for the tapered end $7^a$ of the valve 7. This valve (see Fig. 7) is faced off on opposite sides whereby the passageways $7^b$ are provided for the flow of gas which passes the tapered end of the valve. At its rear or discharge end, the valve 7 is provided with a reduced stud $7^c$ which is adapted to extend into the interior of a helical spring 8 bearing at one end against the shoulder 7ᵈ of the valve body, and at its opposite end against the shoulder 4ᶠ intermediate the bore 4ᶜ and the bore 4ᵈ.

The delivery end of the connection 4 discharges into the regulator proper, which will now be described. The regulator comprises a hollow body 9 having one end interiorly threaded for a cover 10, said cover having an opening 10ᵃ in the central portion thereof and an internally threaded ring or flange 10ᵇ adapted to receive a cap 11. At its opposite end, the body 9 is provided with an external thread 9ᵃ for the reception of a cover 12, said cover having a central hollow projection 12ᵃ which is provided with an internally threaded opening at its extreme outer end for the reception of the thread of an adjusting screw 13 having an operating handle 13ᵃ.

The body 9 is provided with a chamber 9ᵇ, constituting an extension of the inlet connection and preferably formed by casting the walls 9ᶜ of said chamber therewith. The connection 4 discharges into this chamber, and this chamber communicates directly with a gage 13ᵇ which indicates the pressure within the tank 1 and hence the capacity or contents of said tank at any time. One of the walls 9ᶜ of the chamber 9ᵇ is provided with a threaded aperture in axial alinement with the opening 10ᵃ and whereinto there is threaded a tip 9ᵈ, said tip having an axial bore 9ᵉ through which gas is supplied into the regulator chamber A.

A diaphragm 14 is applied to the threaded end 9ᵃ of the body 9 and is clamped thereto by means of the cover 12. This diaphragm is provided with a central bore for the reception of a stud 15 having at one end a head 15ᵃ which carries a yoke 16, said head bearing against the diaphragm. On the side of the diaphragm opposite the head 15ᵃ there is provided a plate 17 having a central sleeve 17ᵃ for the stud 15. A helical spring 18 surrounds the sleeve 17ᵃ and bears at one end against the plate 17 and at its opposite end against a plate 19 having a central depression for the end of the adjusting screw 13.

The yoke 16 straddles the chamber 9ᵇ and the tip 9ᵈ and has secured to its ends (as by means of screws 20ᵃ) a plate 20. This plate has a central bore which is axially arranged with respect to the bore of the tip. The bore through the plate comprises three sections of progressively increasing diameter whereby an annular shoulder 20ᵇ is provided with a cylindrical chamber thereabove, the outer or cap-facing end of said bore being threaded, as indicated at 20ᶜ. In the seat provided by the annular shoulder 20ᵇ and the part of the bore thereabove, I insert a valve, said valve comprising a metallic casing 21 having a valve block 21ᵃ therein which is adapted to coöperate with the tip 9ᵇ.

This valve is removably held to its seat by means of a screw plug 22 threaded into the bore 20ᶜ, the plug and the valve being capable of convenient removal and application by means of the cap 11.

Communicating with the enlarged regulator chamber A which surrounds the chamber 9ᵇ is a gage 22ᵃ which indicates the pressure of the gas within the regulator chamber and within the conduit leading therefrom to the point of use.

Extending from the regulator chamber proper is an outlet connection 23, said outlet connection being cupped at its delivery end for the reception of the correspondingly-shaped end 24ᵃ of a hose connection 24, said hose connection being shown as secured in place by means of the gland nut 24ᵇ threaded onto the outer end of the connection 23. The connection 23 is provided with a central bore 23ᵃ communicating with the regulator chamber by a contracted portion 23ᵇ. The outer end of the bore 23ᵃ is restricted by means of a plug 25 (similar to the plug 6) threaded into the outer end of the connection and having a central bore 25ᵇ. In the bore 23ᵃ there is mounted a valve, indicated generally at 26 and preferably constructed in the same manner as the valve 7. The tapered end 26ᵃ of this valve coöperates with the restricted bore 23ᵇ and a helical spring 27 surrounds the stud (not shown) on said valve, bearing at one end against the shoulder provided about said stud and at its opposite end against the body of the plug 25. From the connection 24 a hose pipe 28 of usual construction extends to the point of use. Where the regulator is employed with a cutting or welding torch, it will be understood that another tank identical with the tank 1, may be employed and that this tank may be equipped with a regulator identical with the one just described and connected to the cutting or welding torch by a hose similar to the hose 28.

In operation sufficient pressure within the regulator chamber will seat the valve 21 by reason of the pressure exerted upon the diaphragm. In practice, the screw 13 will be adjusted to compress the spring 18 so that the valve 21 will not seat until the desired working pressure, indicated by the gage 22, is secured. For instance, this pressure may be 50 pounds. By opening the cap 11 and operating the screw 13, the valve 21 may be positioned with reference to the jet 9ᵈ so that the valve will close when this pressure, is exceeded. Should it be desired to vary the working pressure, this variation is effected by adjusting the screw 13 in the appropriate direction. The valve 21 thus coöperates with the jet to automatically maintain the desired constant working pressure within the regulator chamber A and within the hose leading to the point of use.

Should the valve 2 be closed and the screw 13 be left in its adjusted working position, the valve 21 may be held from its seat against the tip 9ᵇ. Then if the pressure of gas in the tank 1 should be suddenly admitted into the diaphragm chamber, the impact of this gas against the diaphragm might rupture the same as well as the gages, particularly the gage 22ᵃ. However, the valve 21 serves as a baffle which is interposed between the entering gas, the diaphragm, and the gage, so that, even if the operator should not unscrew the set screw 13 when shutting off the valve 2, and should subsequently open the latter valve, the diaphragm and gage will not be ruptured through such careless manipulation.

When the gas within either of the working tanks is nearly exhausted, the pressure will fall below that under which the other tank is operating. Under these circumstances, there is danger that the gas from one tank may back up into the diaphragm chamber. This action is normally prevented by the check valve 26; in the event of leakage of this valve the passage of gas through the diaphragm chamber will be resisted by the valve 21. Finally, should the latter valve be unseated, it will be further resisted by the valve 7—wherefore the gas from one source of supply cannot enter the other source of supply. Furthermore, in the event of a "backfire" within the tube 28, this backfire ordinarily will not be transmitted to the diaphragm chamber because of the valve 26. However, should it happen to pass said valve, the pressure of the backfire will operate upon the diaphragm to close the valve 21 and, should any of the backfire pass the latter valve, it cannot enter the tank 1 because of the valve 7.

Reference has been made hereinbefore to the immunity of my regulator from freezing because of the sudden expansion of the entering gas. This is due to the proportion of the bore 9ᵉ for each tip 9ᵈ to the pressure of the gas supplied thereto. I have found that, if said bore be made with a No. 35 standard twist drill, U. S. gage, I can operate under the maximum pressure (250 to 300 pounds) which is used with hand cutting-torches with a tank pressure as high as 1800 pounds and with perfect regulation of the pressure and without causing such expansion of the gas beyond the orifice as to produce this freezing action. Should a greater working pressure be desired, I can then replace the tip 9ᵇ with one having a bore therethrough which is enlarged in proportion to th· pressure required for the particular operation.

It will be observed that the outlet connection 3 and the inlet connection 4 are short. This places the regulator and the hose and gages connected thereto in close proximity to the tank 1 so that there will be no danger of the latter being overturned by the weight of the parts connected thereto.

Having thus described my invention, what I claim is:

1. In a regulator, the combination of a casing having a diaphragm therein, said casing having an inlet connection and an outlet connection, a valve in the inlet connection adapted to be closed by the pressure of the gas within said casing, a valve in the outlet connection adapted to be closed by the pressure of the gas on the delivery side thereof, and a valve operatively connected with said diaphragm and controlling the supply through the inlet connection to the casing.

2. In a regulator, the combination of a casing having an inlet and an outlet connection, the inlet connection being provided with a discharge orifice through which the entering gas may be discharged into said casing, a diaphragm in said casing, a valve connected to said diaphragm and coöperating with said discharge orifice to regulate the pressure of the gas within said casing, a valve in said inlet connection adapted to be seated by the pressure of the gas on the delivery side thereof, and a valve in the outlet connection adapted to be seated by the pressure of gas on the delivery side thereof.

3. In a regulator, the combination of a casing having an inlet and an outlet connection, the inlet connection being provided with a discharge orifice through which the entering gas may be discharged into said casing, a diaphragm in said casing, a valve connected to said diaphragm and coöperating with said discharge orifice to regulate the pressure of the gas within said casing, a valve in said inlet connection adapted to be seated by the pressure of the gas on the delivery side thereof, a valve in the outlet connection adapted to be seated by the pressure of gas on the delivery side thereof, and means whereby the pressure at which the first mentioned valve is closed may be varied.

4. In a regulator, the combination of a casing having a diaphragm therein, a valve operatively connected with the diaphragm to control the supply of gas to said casing, and a gas connection communicating with the casing, said connection being provided with a bore and said bore being restricted at the receiving and delivery ends thereof, a valve in said bore having a tapered end coöperating with one of the restricted portions of said bore and having a body providing with the enlarged portion of said bore a passageway for gas, the opposite end of said valve being provided with a reduced stud, and a spring surrounding said stud and interposed between the enlarged portion of the valve body and the adjacent reduced portion of the bore.

5. In a regulator, the combination of a casing having an inlet and an outlet connection, a diaphragm in said casing, a valve operatively connected with said diaphragm and controlling the admission of gas into said casing, said inlet connection having a bore which is reduced at the delivery end thereof, a nipple detachably connected to the inlet end of said bore and provided with a bore communicating with the bore of said connection, a valve in the bore of said connection interposed between said nipple and the delivery portion of the last mentioned bore, and a spring operatively interposed between said valve and such reduced portion of the last mentioned bore.

6. In a regulator, the combination of a casing having an outlet connection and a gas-receiving chamber provided with a discharge outlet, a diaphragm in said casing, a valve connected to said diaphragm and controlling said discharge outlet, a valve in said gas supply connection adapted and arranged to be closed by the pressure of gas within said chamber, a pressure gage communicating with said chamber, a pressure gage communicating with the casing between the said discharge outlet and the outlet connection, and a valve in the outlet connection adapted to be closed by the pressure of the gas on the delivery side thereof.

7. In a regulator, the combination of a casing having an outlet connection and a gas-receiving chamber provided with a discharge outlet, a diaphragm in said casing, a valve connected to said diaphragm and controlling said discharge outlet, a valve in said gas supply connection adapted and arranged to be closed by the pressure of gas within said chamber, a pressure gage communicating with the casing between the said discharge outlet and the outlet connection, and a valve in the outlet connection adapted to be closed by the pressure of the gas on the delivery side thereof.

In testimony whereof, I hereunto affix my signature.

JOHN HARRIS.